United States Patent
Wang et al.

(10) Patent No.: US 10,825,221 B1
(45) Date of Patent: Nov. 3, 2020

(54) MUSIC DRIVEN HUMAN DANCING VIDEO SYNTHESIS

(71) Applicant: ADOBE INC., San Jose, CA (US)

(72) Inventors: Zhaowen Wang, San Jose, CA (US); Yipin Zhou, Chapel Hill, NC (US); Trung Bui, San Jose, CA (US); Chen Fang, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/392,041

(22) Filed: Apr. 23, 2019

(51) Int. Cl.
| | |
|---|---|
| *G06T 13/20* | (2011.01) |
| *G06N 3/04* | (2006.01) |
| *G06N 3/08* | (2006.01) |
| *G06T 7/70* | (2017.01) |
| *H04N 5/265* | (2006.01) |
| *G10L 25/30* | (2013.01) |
| *G06K 9/00* | (2006.01) |

(52) U.S. Cl.
CPC ........ *G06T 13/205* (2013.01); *G06K 9/00369* (2013.01); *G06N 3/0445* (2013.01); *G06N 3/0454* (2013.01); *G06N 3/08* (2013.01); *G06T 7/70* (2017.01); *G10L 25/30* (2013.01); *H04N 5/265* (2013.01); *G06T 2207/10004* (2013.01); *G06T 2207/20081* (2013.01); *G06T 2207/20084* (2013.01); *G06T 2207/30196* (2013.01)

(58) Field of Classification Search
CPC ...................... G06T 13/205; G06T 7/70; G06T 2207/10004; G06T 2207/20081; G06T 2207/20084; G06T 2207/30196; G06N 9/00369; G06N 3/0445; G06N 3/0454; G10N 25/30; H04N 5/265
See application file for complete search history.

(56) References Cited

U.S. PATENT DOCUMENTS

2015/0055929 A1* 2/2015 Van Hoff ............. H04N 13/117
386/201

OTHER PUBLICATIONS

Tang et al., Dance with Melody: An LSTM-autoencoder Approach to Music-oriented Dance Synthesis, MM'18, Jul. 2018, 9 pages. (Year: 2018).*

Shlizerman, Eli et al., "Audio to Body Dynamics", The IEEE Conference on Computer Vision and Pattern Recognition (CVPR), 2018, pp. 7574-7583.

Donahue, Chris, "Dance Dance Convolution", ICML'17 Proceedings of the 34th International Conference on Machine Learning—vol. 70, Aug. 2017, pp. 1039-1048.

* cited by examiner

*Primary Examiner* — Haixia Du
(74) *Attorney, Agent, or Firm* — F. Chau & Associates, LLC

(57) ABSTRACT

The present disclosure provides a method for generating a video of a body moving in synchronization with music by applying a first artificial neural network (ANN) to a sequence of samples of an audio waveform of the music to generate a first latent vector describing the waveform and a sequence of coordinates of points of body parts of the body, by applying a first stage of a second ANN to the sequence of coordinates to generate a second latent vector describing movement of the body, by applying a second stage of the second ANN to static images of a person in a plurality of different poses to generate a third latent vector describing an appearance of the person, and by applying a third stage of the second ANN to the first latent vector, the second latent vector, and the third latent vector to generate the video.

20 Claims, 10 Drawing Sheets

MUSIC DRIVEN HUMAN DANCING VIDEO SYNTHESIS

BACKGROUND

1. Technical Field

This disclosure relates to techniques for generating human dancing videos from music, and more particularly to, techniques for generating human dancing videos from music using neural networks.

2. Discussion of Related Art

Music and dancing are two related events that are often intertwined. Humans, especially professional dancers, are able to infer some reasonable dance movements when listening to music based on the rhythm, beat, and even genre.

The use of computerized programs to automatically generate reasonable human dancing videos from music may provide rich source materials and inspiration for choreographers. These programs may also facilitate editing of animations and movies, without people having to manually draw each frame for the animation or have a human actor practice a very difficult dance to perform the dance professionally.

For example, a computerized program can generate predicted arms and fingers motion given piano or violin music, and apply 3D rendering to visualize a predicted motion sequence, but the video generated would not appear to be human body movement that is realistic and smooth, nor synchronized well with music.

Thus, there are several challenges with regard to conventional systems that attempt to synthesize human body movement synchronized with music.

BRIEF SUMMARY

Embodiments of the present disclosure provide benefits and/or solve one or more of the foregoing and other problems in the art with systems, non-transitory computer-readable media, and methods for creating videos including realistic and smooth human body movement in synchronization with music. In particular, in one or more embodiments, the disclosed system is implemented by a two-stage sequence-to-sequence framework that generates human motion videos conditioned on input music. The two-stage framework can help to restrict the complexity of the conditional task of generating a video of a target person dancing to given music by introducing pose as an intermediate output.

The first stage (e.g., a music-to-pose neural network) includes two components: (1) a waveform encoder and (2) a pose coordinates decoder. The music is represented using raw waveform samples. A first recurrent neural network (RNN) may be applied to encode the waveform into features. Then, a second RNN may be used to decode the features into coordinates of body part landmarks (pose).

The second stage (e.g., a pose-to-dance neural network) includes three components: (1) a pose decoder, (2) an appearance encoder, and (3) a video decoder. The pose encoder represents the pose sequence as a latent vector describing the body movement. The appearance decoder may be a convolutional neural network (CNN) that takes a set of images of the target person in various poses as inputs and extracts a latent vector describing the target person's appearance. The video decoder may be an RNN that takes the concatenated latent features of waveform, pose, and appearance as inputs, and generates a sequence of video frames as output. In this way, the pose generation and appearance generation are decoupled, making it easier to generate the same dance for different people under the same music. This is particularly useful for generating synchronized dancing video for a group of people.

The video decoder is able to generate a target person's dancing video in a background scene, which is the same as the background scene in images of the target person in different poses that were initially fed to the second stage. If the images of the target person in the different poses have a uniform background color, the output video will also have a uniform background color.

Additional features and advantages of the above embodiments and additional embodiments of the present disclosure are outlined in the description which follows, and in part will be obvious from the description, or may be learned by the practice of such example embodiments.

BRIEF DESCRIPTION OF THE DRAWINGS

The detailed description describes one or more embodiments with additionally specificity and detail through use of the accompanying drawings, briefly described below.

DETAILED DESCRIPTION OF THE EXEMPLARY EMBODIMENTS

One or more embodiments of the present disclosure include a music driven human dancing video synthesizer that trains a music-to-pose neural network and a pose-to-dance neural network to generate a video of a human being dancing from input music and input images of the human being. For example, in one or more embodiments, the music driven human dancing video synthesizer trains the music-to-pose neural network to generate, from dancing videos including digital images and digital audio, feature vectors.

The music driven human dancing video synthesizer also trains the pose-to-dance neural network to generate a video based on the feature vectors. The music driven human dancing video synthesizer then utilizes the trained music-to-pose neural network and the trained pose-to-dance neural network to generate a video of a human being dancing in synchronization with music using input music and input images of the human being. The human dancing video synthesizer may also be used to generate a video of multiple people dancing in synchronization with the same music and with one another.

The music driven human dancing video synthesizer provides many advantages and benefits over conventional systems and methods. For example, the music driven human dancing video synthesizer's use of the music-to-pose neural network combined with the pose-to-dance neural network provides better prediction of human body motion under a generalized scenario, provides more subjective dancing motion, and provides human body movements with a higher degree of freedom relative to conventional systems. Specifically, application of the pose-to-dance neural network to actual images of a target person in numerous poses and sequences of coordinates of numerous body part landmark points output by the music-to-pose neural network pre-trained on numerous videos of people dancing to various different types of music allows the synthesizer to generate realistic and smooth human body movements that match and synchronize well with any input music.

Further, by use of the pose-to-dance neural network, the music driven human dancing video synthesizer improves efficiency relative to conventional systems. For example, the pose-to-dance neural network is capable of generating synthetic video of a person dancing to input music without having to rely on an additional 3D renderer to visualize the predicted motion. In particular, the pose-to-dance neural network's application of a neural network to an aggregation of vectors that describe a music waveform, poses of a generic body, and appearance of a target person, enables the music driven video synthesizer to render images for a video without having to pass data to a separate external 3D renderer.

Figure 1:
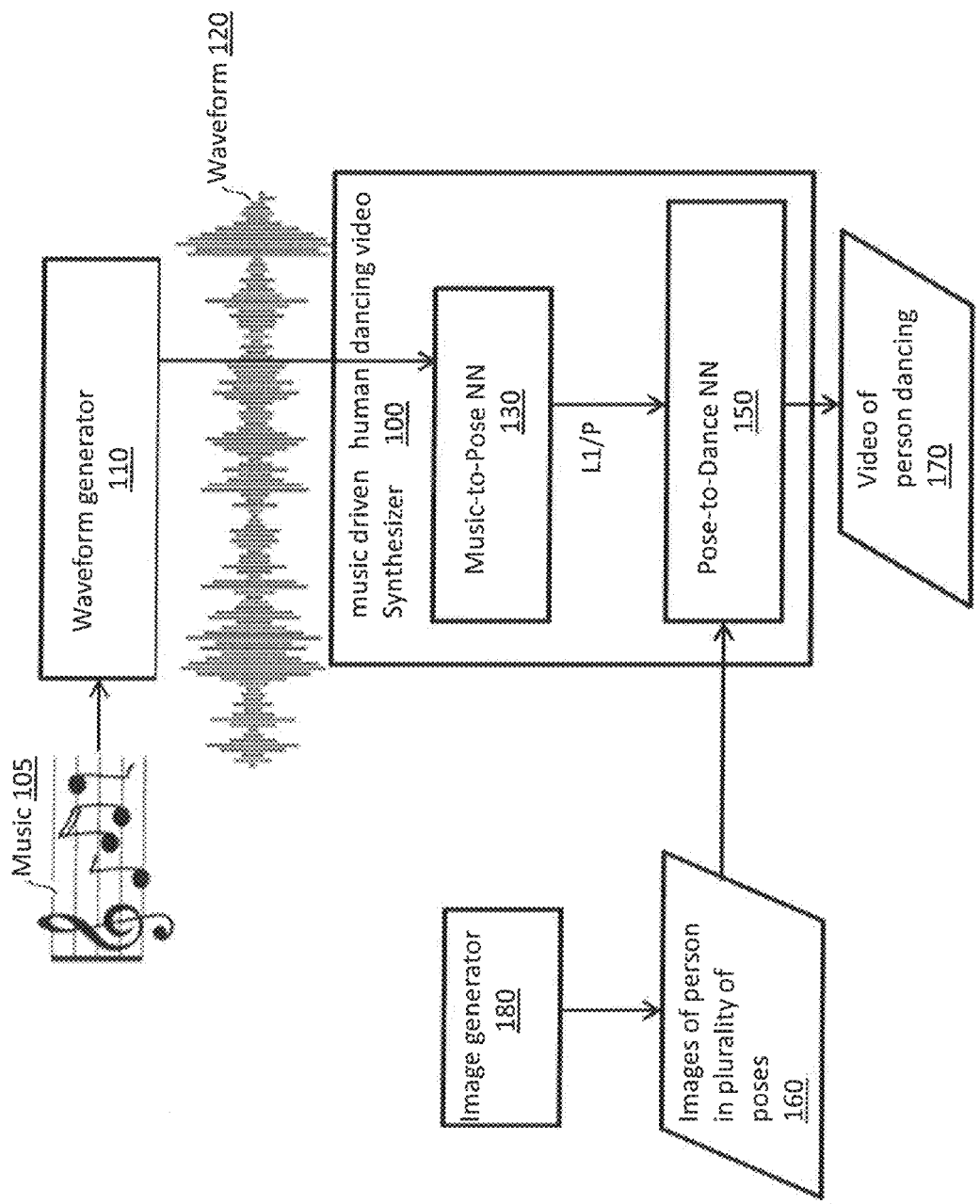
FIG. 1 illustrates a system including a human dancing video synthesizer according to an exemplary embodiment of the invention.

Additional detail will now be provided regarding the music driven human dancing video synthesizer in relation to illustrative figures portraying exemplary embodiments. In particular, FIG. 1 is a block diagram illustrating a system including the human dancing video synthesizer 100 according to an exemplary embodiment of the inventive concept. The system includes the human dancing video synthesizer 100, a waveform generator 110, and an image generator 180.

The waveform generator 110 processes received music 105 to generate a raw audio waveform 120. In an embodiment, the waveform generator 110 has a microphone that enables it to capture sound and an analog-to-digital converter to convert the sound into a raw audio waveform. For example, if a user is currently using a speaker to play a given selection of music, the microphone can capture the sound and the analog-to-digital converter can periodically convert an analog voltage output by the microphone that is representative of the sound to a digital value that is representative of the amplitude of the sound. The waveform generator 110 can then output a series of these digital values as the raw audio waveform 120 to the music driven human dancing video synthesizer 100.

In another embodiment, the waveform generator 110 includes a user interface that enables a user to select one of a plurality of different previously stored music files, process the selected music file to generate the digital values, and output the digital values as the raw waveform 120 to the human dancing video synthesizer 100. The user interface may also enable the user to search the Internet for music to download so the raw audio waveform 120 can be extracted from the downloaded music.

This direct use of the raw audio waveform 120 samples by the synthesizer 100 prevents loss of information as opposed to prior techniques that use mel-frequency cepstral coefficients (MFCC) to represent the music 105. Since MFCC is a lossy representation of the music 105, the direct use of the raw audio waveform 120 by the synthesizer 100 ensures that all or most information of the music 105 is retained.

Figure 8:
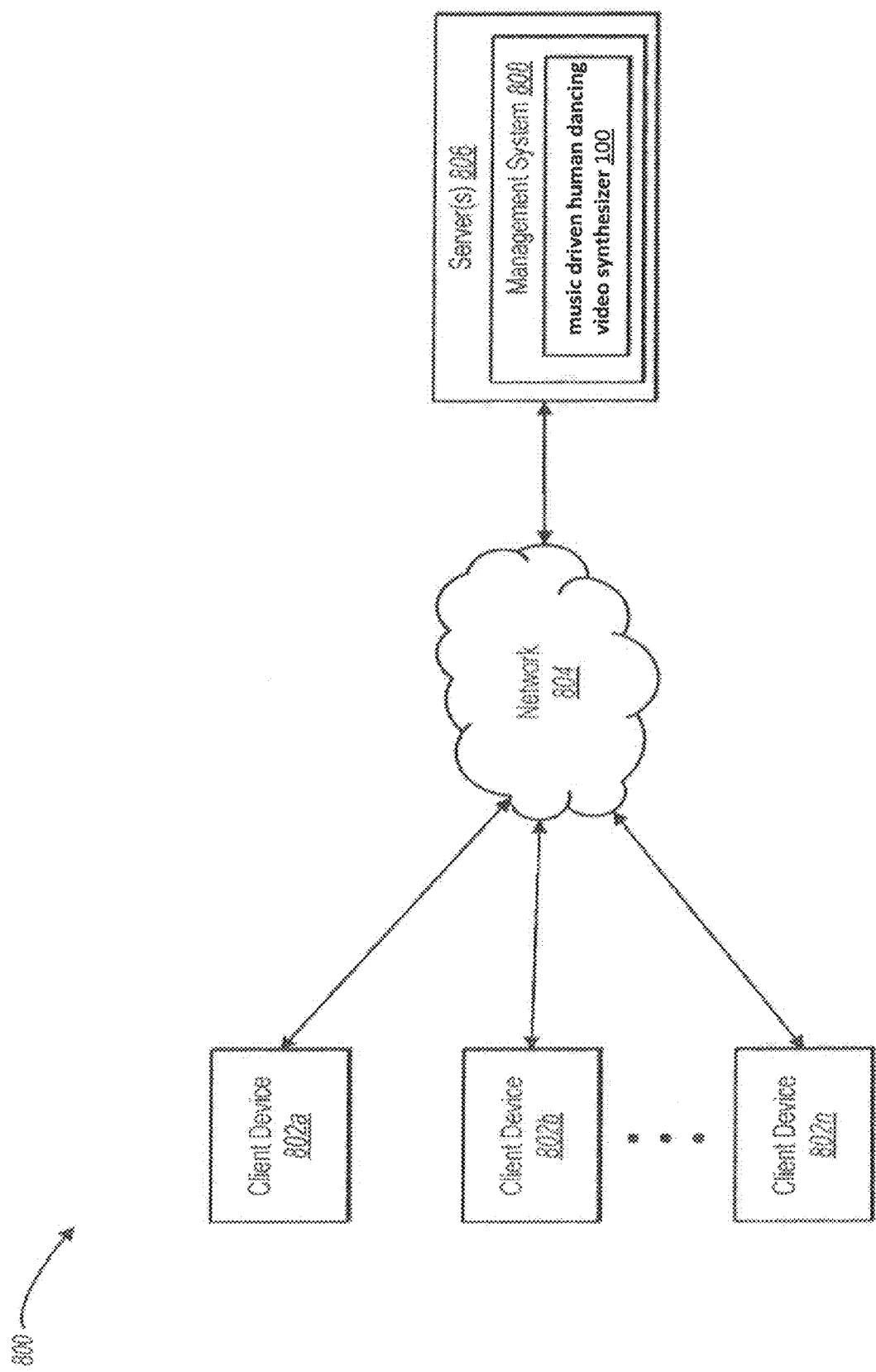
FIG. 8 illustrates a schematic diagram of one embodiment of an exemplary environment in which the music driven human dancing video synthesizer can operate.

In another embodiment, the waveform generator 110 is implemented within a client device (e.g., client device 802a in FIG. 8) connected to the music driven human dancing synthesizer 100 across a computer network (e.g., network 804 in FIG. 8). In this embodiment, the client device includes a user interface that enables the user to select one of a plurality of different previously stored music files, process the selected music file to generate the digital values, and output the digital values across the network 804 to the music driven human dancing video synthesizer 100. The client device may also include a microphone to capture sound and an analog-to-digital converter to periodically convert an analog voltage output by the microphone that is representative of the sound to a digital value that is representative of the amplitude (or a peak) of the sound, and then output a series of these digital values as the raw audio waveform 120 across the network 804 to the music driven human dancing video synthesizer 100.

The music driven human dancing video synthesizer 100 includes a music-to-pose neural network (NN) 130 and a pose-to-dance NN 150. The music-to-pose NN 130 samples the raw audio waveform 120, applies a first recurrent neural network (RNN) to the samples to determine a waveform latent vector L1 that describes the waveform 120, applies a second RNN to the waveform latent vector L1 to generate a sequence of coordinates (e.g., x and y coordinates) of points P (e.g., vertices) of body parts of a human body, and outputs the waveform latent vector L1 and the points P to the pose-to-dance NN 150. The pose-to-dance NN applies a third RNN to the waveform latent vector L1, the points P, and images 160 of a person in a plurality of different poses to generate a video 170 of the person dancing. In an exemplary embodiment, each of the images 160 is a still image of the person in a different pose. In an embodiment, the video 170 includes images of the person dancing and the music 105 so that when the video is played, frames of images are sequentially played while portions of the music are sequential played so that the image frames are synchronized with the music portions.

The image generator 180 outputs the images 160 to the pose-to-dance NN 150. In an exemplary embodiment, the image generator 180 includes a display device, a user interface that is presented on a display of the display device, and a camera configured to capture the images 160. For example, the image generator 180 may control the user interface to prompt a user to stand (e.g., stand still) in a certain pose, and then use the camera to capture an image of the user after the user has positioned themselves into the corresponding pose, change the certain pose, and then re-perform the prompting and capturing until a sufficient number of poses have been captured. In another embodiment, the image generator 180 includes several cameras arranged around the user so the images of the multiple poses can be captured at the same or at substantially the same time. In another exemplary embodiment, the image generator 180 is located in a client device (e.g., 802a) that outputs the images across the computer network 804 to the pose-dance NN 150.

Figure 2:
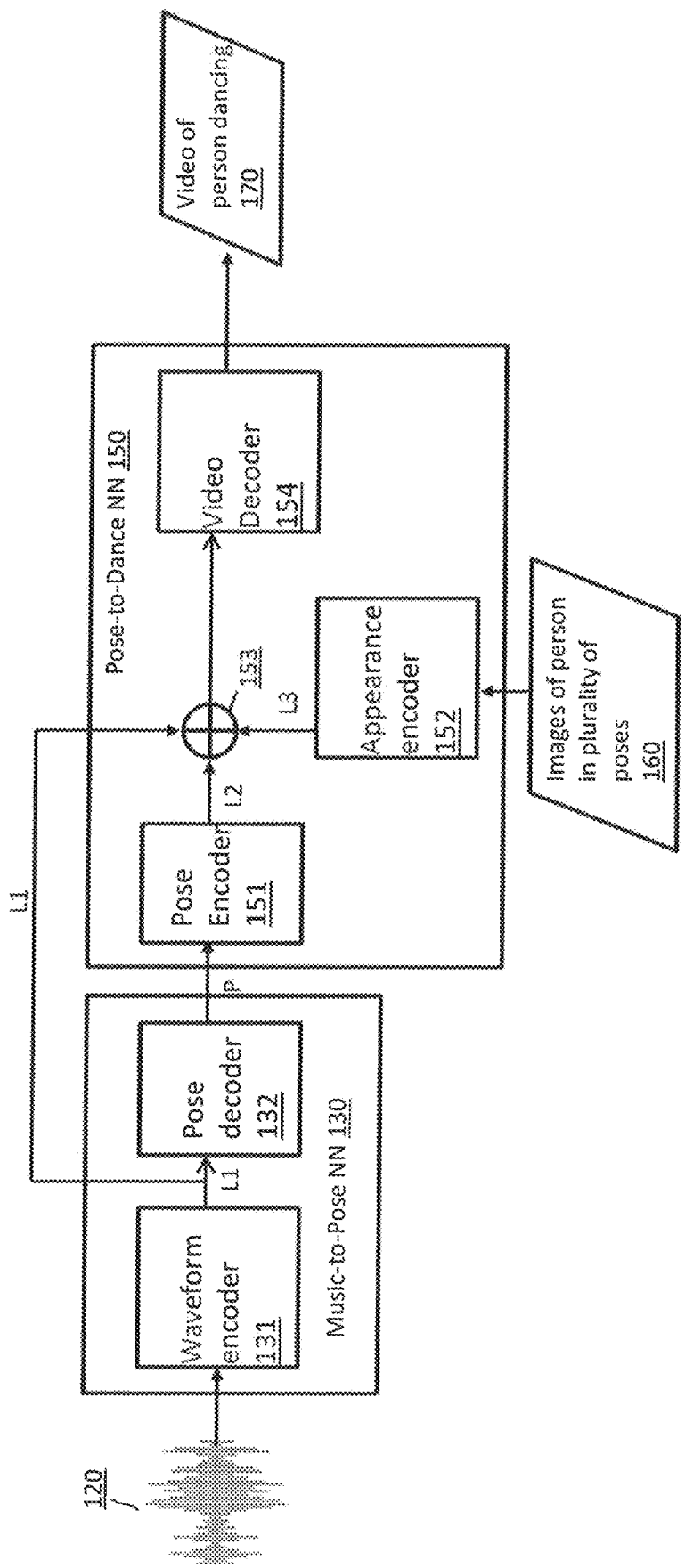
FIG. 2 illustrates an example of elements of the human dancing video synthesizer according to an exemplary embodiment of the invention.

FIG. 2 illustrates examples of the music-pose NN 130 (1st stage) and the pose-dance NN 150 (2nd stage) of FIG. 1 according to an exemplary embodiment of the invention. The music-to-pose NN 130 includes a waveform encoder 131 and a pose decoder 132.

Prior to operating the waveform encoder 131 on a new waveform 120, the waveform encoder 131 is trained. For example, the training may include feeding the waveform encoder 131 a small chunk (e.g., a 1 second duration chunk) of a training music waveform, and repeating this feeding using a next chunk of the training music waveform until the entire training music waveform has been applied to the waveform encoder 131. The training may then be repeated on several other training music waveforms.

The trained waveform encoder 131 then samples the new waveform 120 at a certain sampling rate (e.g., 16 kHz sampling rate) for a certain period of time (e.g., 1 second). The sampling results in a sequence of audio waveform digits. For example, each digit may be an amplitude or a peak of the waveform 120 at the moment the sample was captured. In an exemplary embodiment of the invention, the sequence of digits is than uniformly divided into small chunks and each chunk is fed into a long short-term memory (LSTM) of the waveform encoder 131 recurrently to encode the samples into the waveform latent vector L1 that describes the waveform 120. For example, if the sequence includes 10,240 digits, the sequence could be divided into 10 chunks, where each chunk is 1,024 digits. In an exemplary embodiment, the digits in a chunk are normalized before the chunk is fed to the LSTM of the waveform encoder 131. For example, the digits can be normalized to real values between −1 to 1. When a given chunk is fed to the LSTM of the waveform encoder 131, each node of a given layer of the LSTM takes both the current chunk of a waveform and the hidden state from a previous node. For example, the information learned from a previously encoded chunk is passed to a next node of the LSTM that operates on this information and the current chunk. The sampling of the waveform 120 and the application of the LSTM can then be repeated until the entire waveform 120 has been processed.

In an exemplary embodiment, the waveform encoder 131 and the pose decoder 132 are jointly trained. For example, the waveform encoder 131 takes a first 1-second (or less) waveform sample of training music as a first input to generate a first output, and then the pose decoder 132 is trained on the first output to generate first pose key points for the first 1-second of the training music, and then this is repeated until all of the training music has been fed into the waveform encoder 131. The waveform encoder 131 learns first information when it is trained using the first waveform sample. Then, when the waveform encoder 131 receives the second 1-second waveform sample of the training music, it generates a second output from the second waveform sample and the first information. Similarly, the pose decoder 132 learns second information when it is trained using the first output, and then when it receives the second output, it generates second pose key points for the second 1-second of the training music using the second output and the second information.

In an exemplary embodiment, training of the neural network (e.g., the music-to-pose neural network 130) involves a first step of downloading a video of a human being dancing from the Internet, extracting music from the downloaded video, extracting pose key points (body part landmarks) of the human dancing in the video, and labeling samples of the extracted music with the extracted pose key points to create music-pose key points (ground truth) pairs, and repeating the first step on several other videos to create additional ground truth pairs. The training further includes a second step of inputting music to the neural network to predict pose key points, comparing the predicted pose key points with the ground truth pairs (extracted from the videos) to determine information indicating whether the network has learned correct information or not, and using the information to adjust the neural network.

Figure 3:
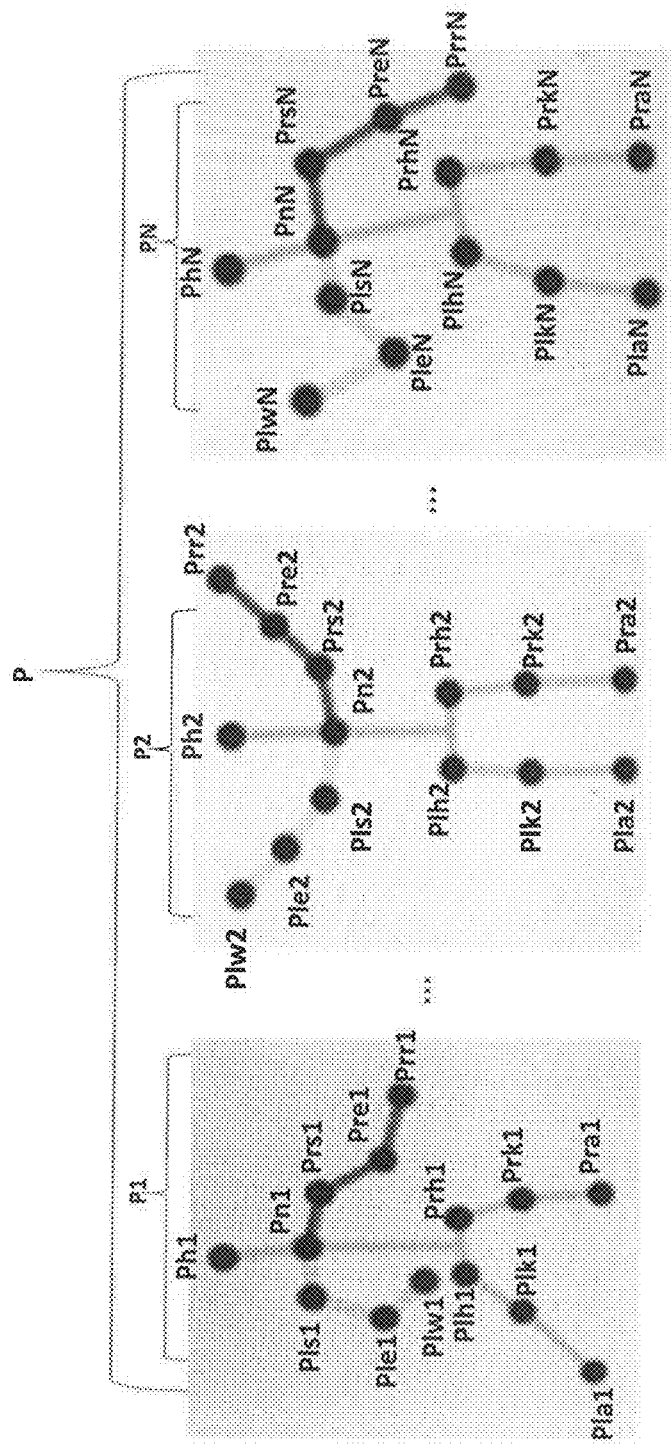
FIG. 3 illustrates an example of a sequence of coordinates that may be output by an element of the human dancing video synthesizer.

In an exemplary embodiment, the pose decoder 132 includes an RNN that decodes the waveform latent vector L1 into the sequence of coordinates of points P. The sequence of coordinates of points P may have an arbitrary length according to a duration of time of the waveform 120. For example, the length increases as the duration of waveform 120 increases. In an exemplary embodiment, the points P are sequences of coordinates of body part landmarks. In an exemplary embodiment, as shown in FIG. 3, the landmark points include 14 points (e.g., center points) of a human being such as a head point PhN representing a point of a head, a neck point PnN representing a point of a neck, a left shoulder point PlsN representing a point of a left shoulder, a right shoulder point PrsN representing a point of a right shoulder, a left elbow point PleN representing a point of a left elbow, a right elbow point PreN representing a point of a right elbow, a left wrist point PlwN representing a point of a left wrist, a right wrist point PrwN representing a point of a right wrist, a left hip point PlhN representing a point of a left hip, a right hip point PrhN representing a point of a right hip, a left knee point PlkN representing a point of a left knee, a right knee point PrkN representing a point of a right knee, a left ankle point PlaN representing a point of a left ankle, and a right ankle point PraN representing a point of a right ankle. The sequence of points P include a time sequence of the head points (e.g., Ph1, Ph2, . . . , PhN) representing motion of the head, a time sequence of the neck points (Pn1, Pn2, . . . , PnN) representing motion of the neck, a time sequence of the left shoulder points (e.g., Pls1, Pls2, . . . , PlsN) representing motion of the left shoulder, a time sequence of right shoulder points (Prs1, Prs2, . . . , PrsN) representing motion of the right shoulder, a time sequence of left elbow points (Ple1, Ple2, . . . , PleN) representing motion of the left elbow, a sequence of right elbow points (Pre1, Pre2, . . . , PreN) representing motion of a right elbow, a sequence of left wrist points (Plw1, Plw2, . . . , PlwN) representing motion of a left wrist, a sequence of right wrist points (Prw1, Prw2, . . . , PrwN) representing motion of the right wrist, a sequence of left hip points (Plh1, Plh2, . . . , PlhN) representing motion of the left hip, a sequence of right hip points (Prh1, Prh2, . . . , PrhN) representing motion of the right hip, a sequence of left knee points (Plk1, Plk2, . . . , PlkN) representing motion of the left knee, a sequence of right knee points (Prk1, Prk2, . . . , PrkN) representing motion of the right knee, a sequence of left ankle points (Pla1, Pla2, . . . , PlaN), and a sequence of right ankle points (Pra1, Pra2, . . . , PraN), where each sequence includes N points, where N is greater than 1.

In an exemplary embodiment, the pose decoder 132 includes an RNN that operates on the chunks of waveform samples to determine the landmark points P. In an exemplary embodiment, the RNN of the pose decoder 132 includes an LSTM, where each LSTM node of the LSTM predicts the coordinates landmark points P of a human body for a current dancing pose based on the input music signal (e.g., a chunk of the waveform 120) as well as the previously generated poses. For example, the second (middle) image in FIG. 3 including points P2 could be considered a current dancing pose that was generated based on the input music 105 and a previous generated dancing pose represented by points P1 in the first (left) image in FIG. 3. The first node of the LSTM of the pose decoder 132 may be initialized with the last hidden state of the last node of the LSTM of the waveform encoder 131.

The pose-to-dance NN 150 includes a pose encoder 151, an appearance encoder 152, an aggregator 153 (or a concatenator), and a video decoder 154. For example, the pose encoder 151 may be referred to as a first stage of the pose-to-dance NN 150, the appearance encoder 152 may be referred to as a second stage of the pose-to-dance NN 150, and the aggregator 153 and the video decoder 154 may be referred to as a third stage of the pose-to-dance NN 150.

In an exemplary embodiment, the pose encoder 151 includes an RNN that operates on coordinates of the landmark points P to generate a pose latent vector L2 that describes movement of the body. The pose latent vector L2 includes features of the landmark points P. In an exemplary embodiment, different from the coordinates of the points P, the pose latent vector L2 is a fixed-dimension vector. The fixed-dimension vector may contain abstracted motion information. For example, one dimension of the fixed-dimension vector may indicate the body is moving right globally, another dimension of the fixed-dimension vector may indicate the speed of movement, and additional dimensions of the fixed-dimension vector may indicate movement information about the body parts. For example, the additional dimensions may include a dimension that indicates the left arm is rotating from a horizontal direction to a vertical direction, a dimension that indicates the right arm is rotating from the vertical direction to the horizontal direction, a dimension that indicates the head is moving from a vertical direction to a tilted direction (e.g., 15 degrees rotated relative to vertical direction), etc.

In an exemplary embodiment, the appearance encoder 152 includes a convolutional neural network (CNN) that operates on the images 160 of a target person in various poses to extract an appearance latent vector L3 that describes an appearance of the target person. The function of the appearance encoder 152 is to let the neural network (e.g., 150) know which person (target person) is to be animated. In an exemplary embodiment, the appearance encoder 152 applies multiple convolutional operations to the target person's picture until it has been encoded as a feature (L3). In an exemplary embodiment, the CNN is implemented using ResNet-50, which is a neural network that was trained on more than a million images from the ImageNet database. The network is 50 layers deep and can classify images into 1000 object categories. In an embodiment, the object categories are used to pre-train the appearance encoder 152 so it can encode the feature of the person correctly. In an embodiment, the ResNet-50 CNN is modified so that its last fully connected (FC) layer is replaced with another FC layer to output an M-dimensional vector (e.g., M=1024) referred to as the appearance vector L3, and the modified CNN receives a concatenation of all the images 160 in a color channel as input.

The aggregator 153 concatenates all the vectors L1, L2, L3 to generate concatenated data, and provides the concatenated data (e.g., the waveform latent vector, the pose latent vector, and the appearance latent vector) to the video decoder 154. In this way, the pose generation is decoupled from the appearance generation, making it easier to generate the same dance for different people under the same music. This is particularly useful for generating synchronized dancing for a group of people. The aggregator 153 may be implemented by a processor or some other logic circuit. In an exemplary embodiment, the hidden states from the LSTM of the pose encoder 151, the LSTM of the waveform encoder 131, and the LSTM of the appearance decoder 152 are concatenated to initialize the hidden state of the video decoder 154.

In an exemplary embodiment, the video decoder 154 includes an RNN that is operated on the concatenated features of waveform, pose, and appearance to generate a sequence of video frames 170, which include video images of the target person dancing. In an exemplary embodiment, the video frames 170 further include the music 105 that was input to the waveform generator 110 so that the target person is seen dancing to the music when the video frames 170 are played. In an exemplary embodiment, the video decoder 154 stacks a frame generation architecture (e.g., a generative model) with an LSTM layer to synthesize the depiction of the person in corresponding dance poses.

Figure 4:
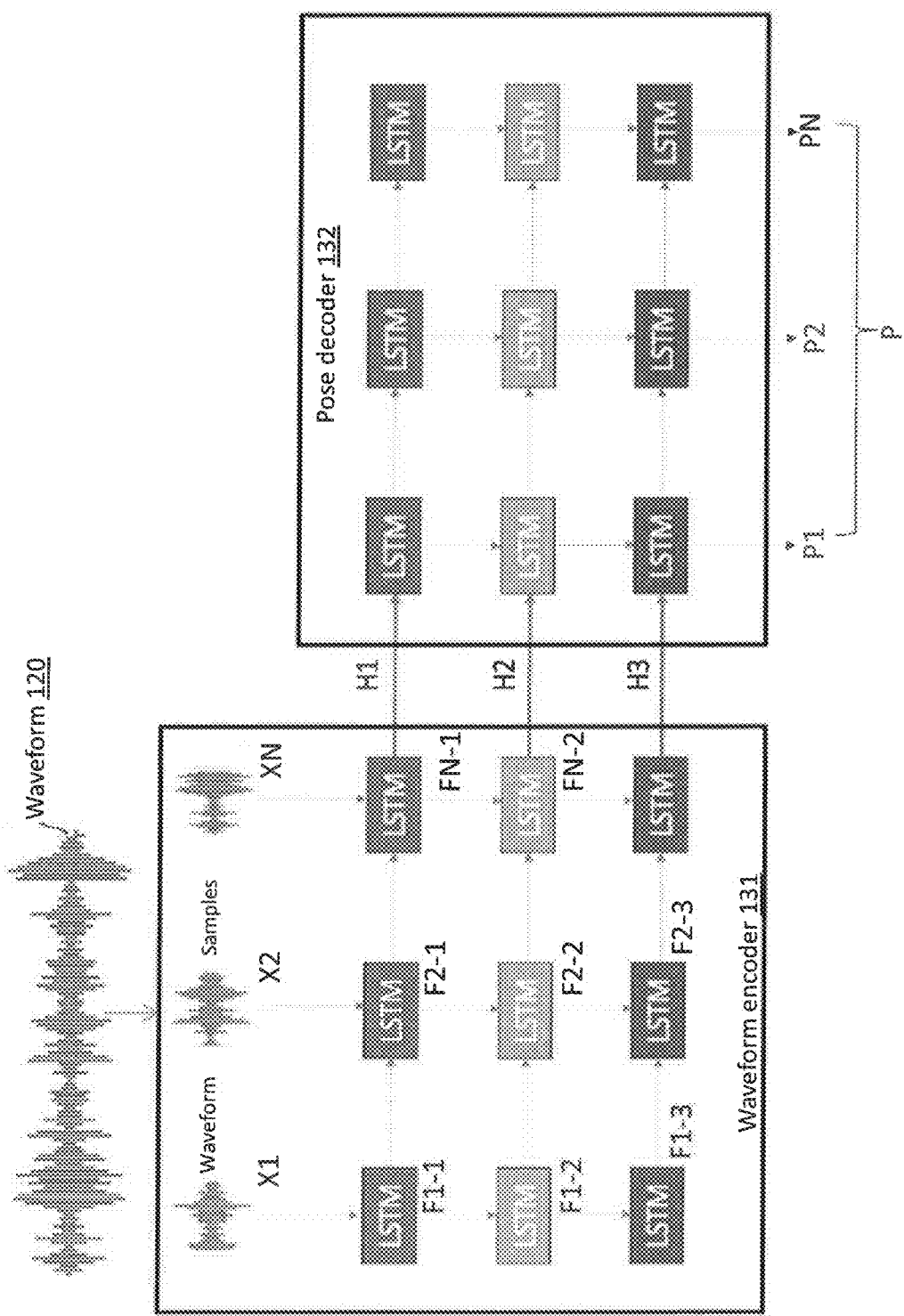
FIG. 4 illustrates an example of a first stage of the human dancing video synthesizer according to an exemplary embodiment of the invention.

FIG. 4 illustrates an example of the waveform encoder 131 and the pose decoder 132 according to an exemplary embodiment of the invention. In an exemplary embodiment, each of the waveform encoder 131 and the pose decoder 132 includes a 3-layer LSTM. For example, the $1^{st}$ layer of the LSTM of the waveform encoder 131 operates on a first waveform sample X1 captured at a first time to generate features F1-1, the $2^{nd}$ layer of the LSTM of the waveform encoder 131 operates on features F1-1 to generate features F1-2, and the $3^{rd}$ layer of the LSTM of the waveform encoder 131 operates on features F2-2 to generate features F1-3. The $1^{st}$ layer of the LSTM of the waveform encoder 131 operates on a second waveform sample X2 captured at a second time and features F1-1 to generate features F2-1, the $2^{nd}$ layer of the LSTM of the waveform encoder 131 operates on features F2-1 and F1-2 to generate features F2-2, and the $3^{rd}$ layer of the LSTM of the waveform encoder 131 operates on features F2-2 and F1-3 to generate features F2-3. The $1^{st}$ layer of the LSTM of the waveform encoder 131 operates on an Nth waveform sample XN captured at an Nth time and features F2-1 to generate features FN2-1, the $2^{nd}$ layer of the LSTM of the waveform encoder 131 operates on features F2-2 and FN-1 to generate features FN-2, and the $3^{rd}$ layer of the LSTM of the waveform encoder 131 operates on features F2-3 and FN-2.

The first layer of the LSTM of the pose decoder 132 operates on a hidden state H1 output by the first layer of the LSTM of the waveform encoder 131 during a first time interval to generate first features, the second layer of the pose decoder 132 operates on the first features and a hidden state H2 output by the second layer of the LSTM of the waveform encoder 131 during the first time interval to generate second features, and the third layer LSTM of the pose decoder 132 operates on the second features and a hidden state H3 output by the third layer of the LSTM of the waveform encoder 131 to generate a first sequence of points P1 of the body parts. The pose decoder 132 may apply its LSTM to the hidden states output by the waveform encoder 131 during a second time interval to generate a second sequence of points P2 of the body parts, and apply its LSTM to the hidden states output by the waveform encoder 131 during an N-th time interval to generate an N-th sequence of points PN of the body parts.

Figure 5A:
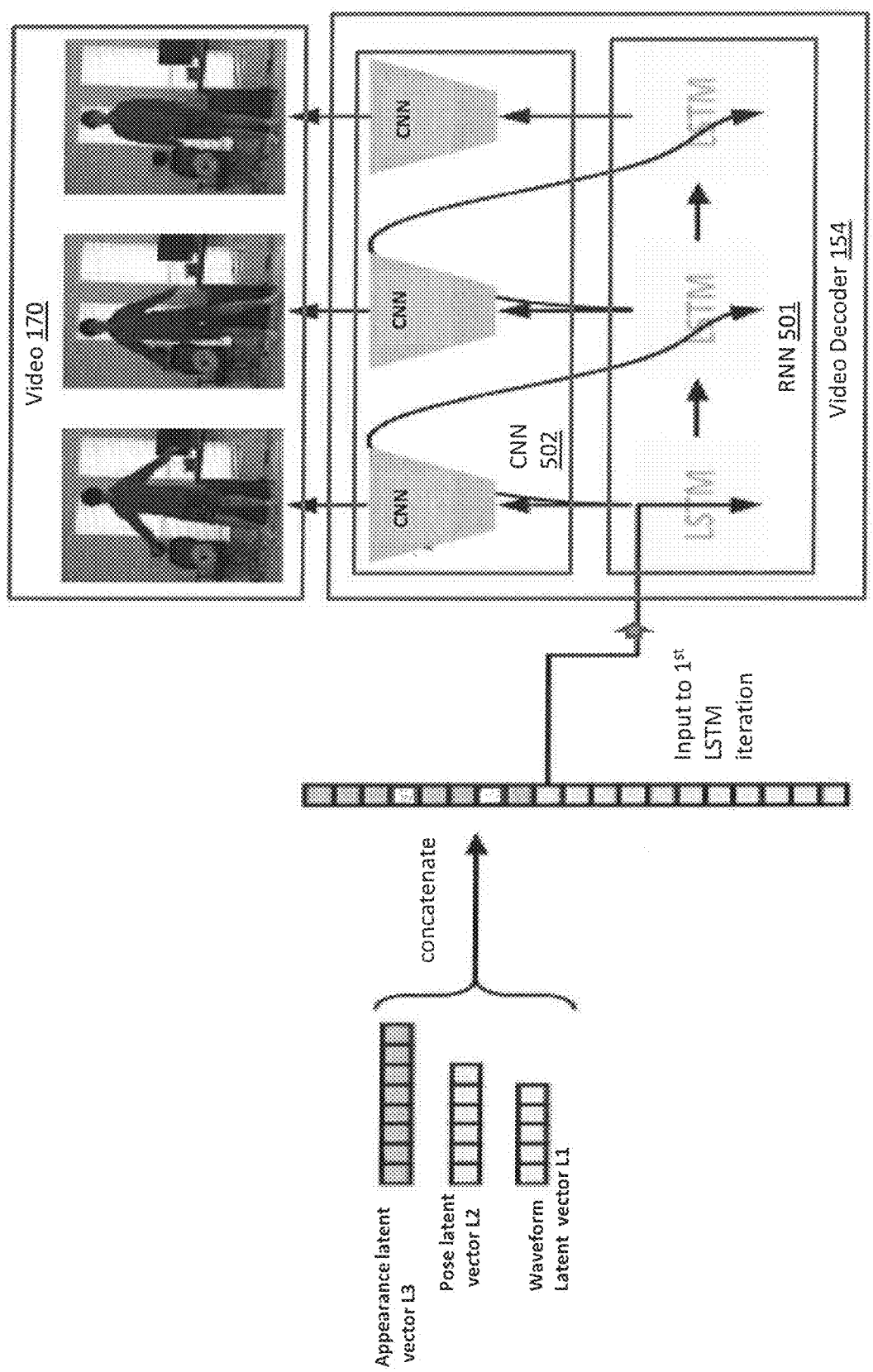
FIG. 5A illustrates an example of an element of the human dancing video synthesizer according to an exemplary embodiment of the invention.

FIG. 5A illustrates an example of the video decoder 154 according to an exemplary embodiment of the inventive concept. As shown in FIG. 5A, the video decoder 154 includes an RNN 501 and a CNN 502. The waveform latent vector L1, the pose latent vector L2, and the appearance latent vector L3 are concatenated, and a result of the concatenation is fed to an LSTM of the RNN 501. In an exemplary embodiment, the RNN 501 includes 3-layers of LSTM units, which operates on the concatenation of the encoded feature from the pose encoder 152 (L2), the output of the appearance encoded 152 (L3), and the output of the waveform encoder 131 (L1) to output encoded information that is fed to CNN 502 indicating the target person's appearance and what pose he should perform. The CNN 502 will generate corresponding video frames 170 based on the encoded information. In an embodiment, the CNN 502 was previously trained using data like the encoded information.

In an exemplary embodiment, the pose latent vector L2 includes coordinates for several time intervals, which can be divided into groups corresponding to each of the body parts. The numbers in each of these groups represent at least one of the initial central position of the corresponding body part, its moving speed, and a 3D trajectory during the corresponding time interval.

In an exemplary embodiment, the waveform latent vector L1 represents a short piece of music audio signal (e.g., 10 seconds). The numbers in the waveform latent vector waveform latent vector L1 can be divided into different groups, each corresponding to one of a plurality of different frequency bands. Different frequency bands may correspond to different musical instruments or different human singers. Each of these groups may indicate at least one of a sound volume, a rhythm, or a tempo for a corresponding frequency band.

In an embodiment, the appearance latent vector L3 includes a plurality of groups of numbers, where each group corresponds to one of the body parts. In an exemplary embodiment, the numbers in each group represent at least one of the color, lighting, texture, and size of the corresponding body part.

The LSTM of the RNN 501 performs an operation on the concatenated data, to generate an output that is fed to the CNN 502. The CNN 502 operates on the output to generate the video 170. The video encoder 154 knows the start and end of the three vectors L1-L3 within the concatenated training data during training. Based on what the video encoder 154 has learned during this training, it is able to infer the start and end of the three vectors L1-L3 within newly input concatenated data.

Figure 5B:
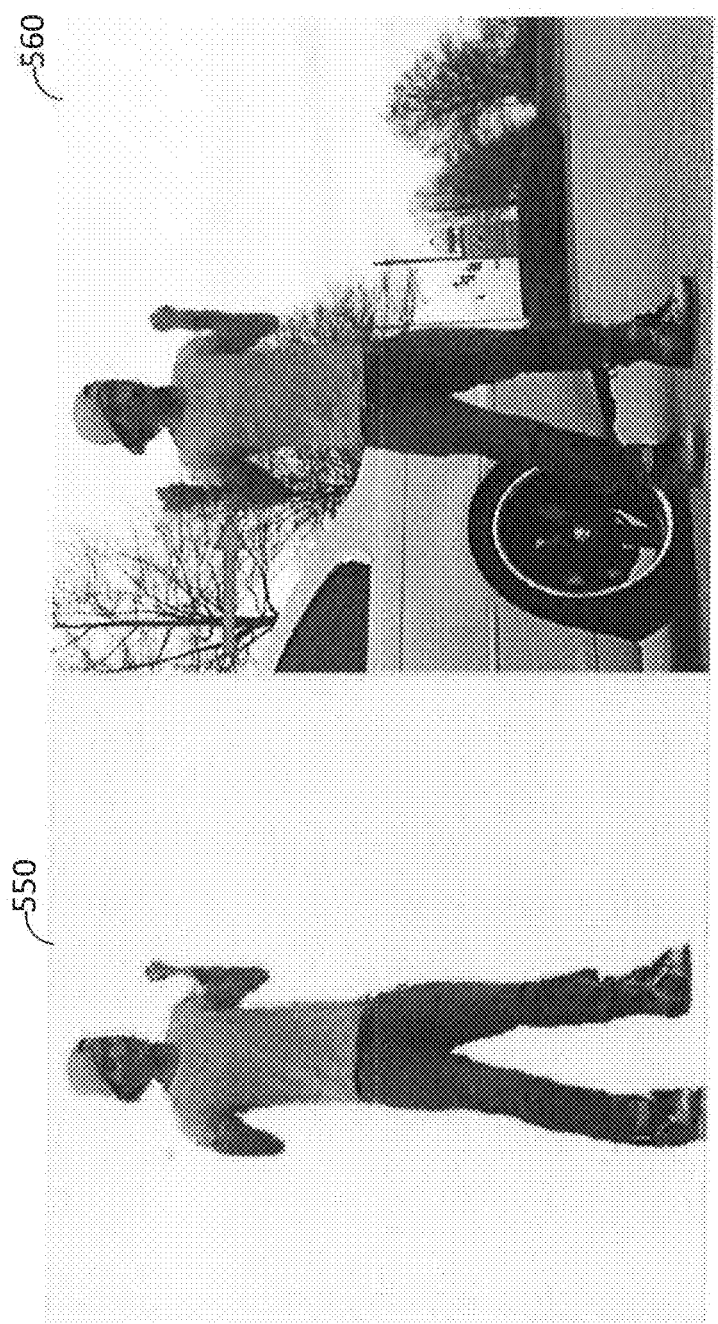
FIG. 5B illustrates an example of using a mask of a body region for merging the human body with a background image.

In an exemplary embodiment, the video decoder 154 is able to generate a dancing video 170 of a person (e.g., a human body) dancing in a background scene, which is the same as the background scene of the images 160 of the person in the plurality of poses. If the images 160 have a uniform background color, the output video 170 will also have a uniform background color, which enables simpler background replacement in the post-processing. In an exemplary embodiment, the video decoder 154 generates images of the human body separately from an image of the background scene (e.g., background image) using the output of the aggregator 153 and merges the images of the human body with the background image to generate frames of the video 170. In an exemplary embodiment, as shown in FIG. 5B, this merging is performed using a mask 550 of a body region to merge an image of the human body with the background image to form a final resulting image 560. A first portion of the mask 550 resembling a human being may overwrite corresponding portions of the background image and a second portion of the mask 550 surrounding the first portion may be transparent so that it does not overwrite corresponding portions of the background image, when the mask 550 is overlapped with the background image. When there are multiple dancers, a similar process may be used to merge several human bodies with one background image. The occlusion between people can be handled by a layer depth map.

In an exemplary embodiment, the LSTM for each of the encoders (e.g., 131, 151, and 152) and the decoders (e.g., 132 and 154) is a 3-layer LSTM. In an exemplary embodiment, the size of the hidden state of the LSTM of the waveform encoder 131, the LSTM of the pose decoder 132, and the LSTM of the pose encoder 151 is set to 1024. In an exemplary embodiment, the size of the hidden state of the video decoder 154 is 3072.

In an exemplary embodiment, the music-to-pose NN 130 ($1^{st}$ stage) and the pose-to-dance NN 150 ($2^{nd}$ stage) are trained separately. For example, the $1^{st}$ stage is trained first and then the $2^{nd}$ stage is appended to the first stage, and the whole system is trained together in an end-to-end manner. In an embodiment, the training includes randomly initializing weights of the system, and application of an Adam optimization method to perform a gradient back-propagation. In an embodiment, when training the $1^{st}$ stage, an L1 loss (Least Absolute Deviation) is used between the ground truth pose coordinates and generated coordinates as an objective function. In an embodiment, when training the $2^{nd}$ stage, a combination of L1 pixel loss, Very Deep Convolutional Networks for Large-Scale Image Recognition (VGG) perceptual loss, pose consistency loss, and generative adversarial loss is used as a training objective to minimize the difference between predicted and ground-truth video frames.

In an exemplary embodiment, the system (e.g. synthesizer 100) is pre-trained on a number (e.g., hundreds, thousands, etc.) of dancing videos with different dancers and various genres for music and dance. The dancing videos may be downloaded from videos that are posted online. In an embodiment, a human pose extractor is run to extract ground-truth poses for training the $1^{st}$ stage. The audio and video signals of each dancing video are split into short clips of a short duration (e.g., a few seconds) as individual training samples, and these short clips are sampled into frames at a first sampling rate (e.g., 15 frames per second). In the second stage, the images 160 of the person are sampled at a second sampling rate (e.g., 3-5 frames per second) that is lower than the first sampling rate.

Figure 6:
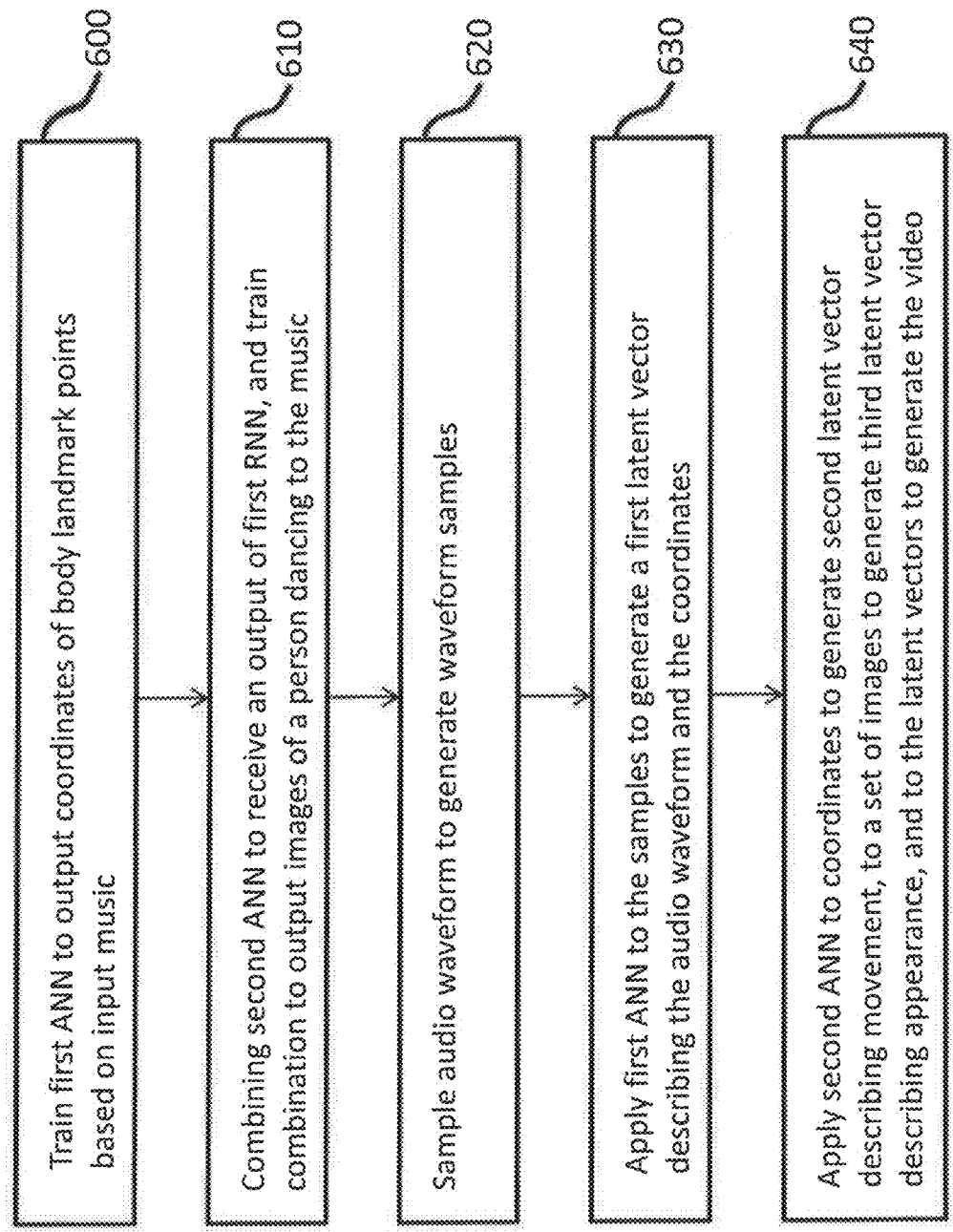
FIG. 6 illustrates a method generating a video of a human being dancing according to exemplary embodiment of the invention.

FIG. 6 illustrates a method generating a video of a human being dancing according to exemplary embodiment of the invention. The method of FIG. 6 includes training a first ANN to output coordinates of body landmark points based on input music (step 600). The method of FIG. 6 further includes combining a second ANN to receive an output of the first ANN, and training the combination to output images of a person dancing to the music (step 610). The method of FIG. 6 further includes sampling an audio waveform to generate waveform samples (step 620). The method of FIG. 6 further includes applying the first ANN to the samples to generate a first latent vector describing the audio waveform and coordinates of the landmark points appropriate for the waveform samples (step 630). The method then includes applying the second ANN to the coordinates to generate a second latent vector describing movement, to a set of images of a target person in a plurality of different poses to generate a third latent vector describing an appearance of the target person, and to all three latent vectors to generate the video (step 640).

Figure 7:
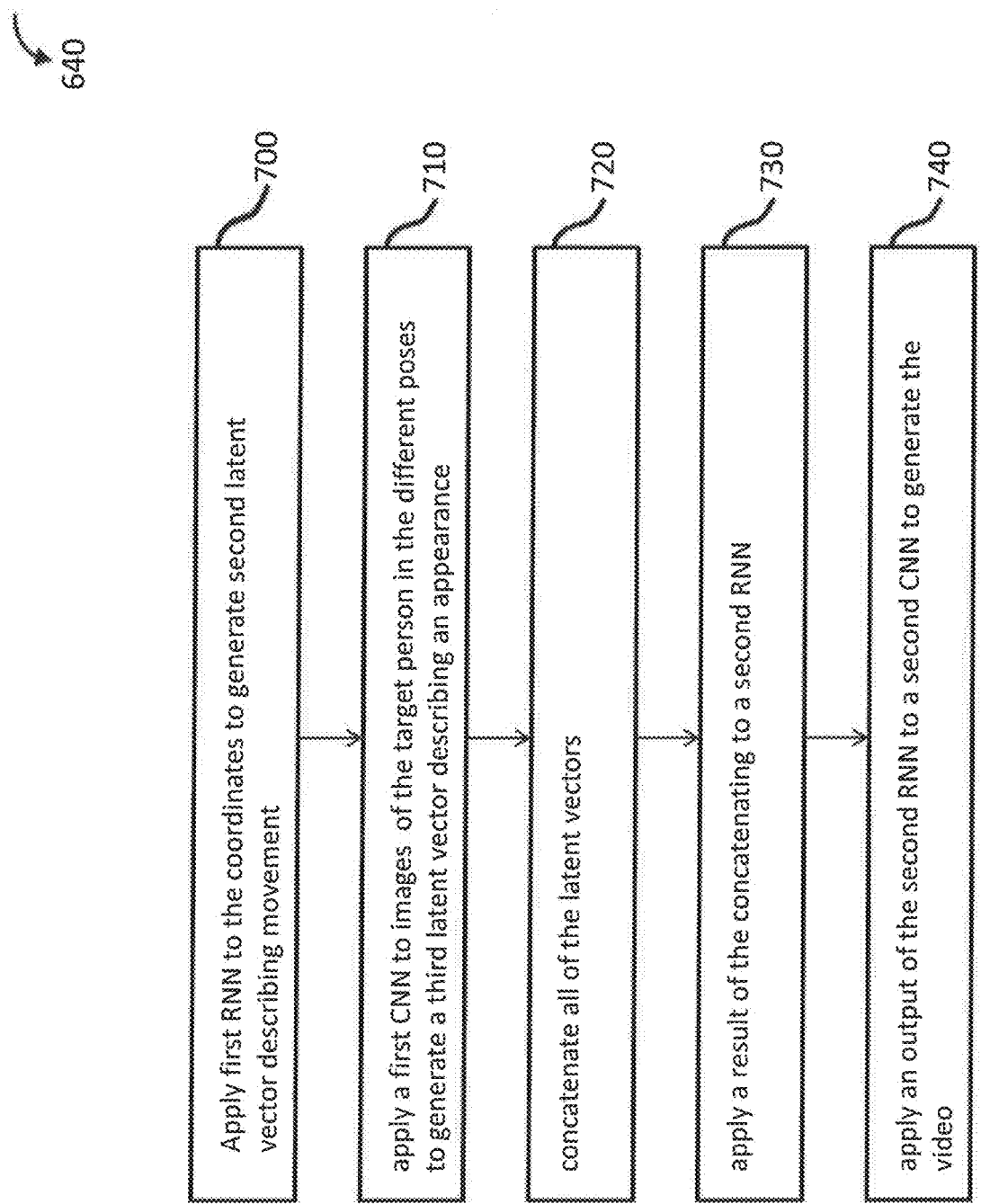
FIG. 7 illustrates a method for performing a step of FIG. 6 according to exemplary embodiment of the invention.

FIG. 7 illustrates a method that may be used to implement step 640 of FIG. 6 according to an exemplary embodiment of the invention. The method of FIG. 7 includes applying a first RNN to the coordinates to generate a second latent vector describing movement (step 700). For example, the second latent vector may describe the movement of a stick figure generated from connecting the body landmark points of a single time together. The method of FIG. 7 further includes applying a first CNN to the images of the target person in a plurality of different poses to generate a third latent vector describing an appearance (step 710). The method of FIG. 7 includes concatenating all of the latent vectors (step 720). For example, the first latent vector generated by step 630 may be concatenated with the second and third latent vectors generated by step 710 and 720, respectively. The method of FIG. 7 further includes applying a result of the concatenating to a second RNN (step 730). The method of FIG. 7 then includes applying an output of the second RNN to a second CNN to generate the video (step 740).

Referring back to FIG. 1, the synthesizer 100 may also be used to generate a video of a group of people dancing in synchrony with music and one another. For example, the images of the person 160 in multiple poses may be replaced with images of multiple people in different poses. In this embodiment, the appearance decoder 152 generates an appearance vector L3 for each of the different people, so that multiple appearance vectors L3 are created. For example, if there is a first person and second person, the video decoder 154 can operate on vectors L1, L2, and the appearance vector L3 of the first person to generate first image frames, operate on vectors L1, L2, and the appearance vector L3 of the second person to generate second image frames, and then perform a merging operation on the first and second frames to generate a video of the first person and the second person dancing in synchrony with the same music and with one another.

FIG. 8 illustrates a schematic diagram of one embodiment of an exemplary environment 800 in which the music driven human dancing video synthesizer 100 can operate. In one or more embodiments, the exemplary environment 800 includes one or more client devices 802a, 802b, . . . 802n, a network 804, and server(s) 806. The network 804 may be any suitable network over which the computing devices can communicate. Example networks are discussed in more detail below with regard to FIG. 9.

In an exemplary embodiment, the waveform generator 110 is included within one of the client devices 802a, 802b, . . . 802n and the image generator 180 is included within the same or another one of the client devices 802a, 802b, . . . 802n, so that the waveform 120 and the images 160 are sent across the network 804 to the synthesizer 100.

As illustrated in FIG. 8, the environment 800 may include client devices 802a-802n. The client devices 802a-802n may comprise any computing device. For instance, in one or more embodiments, one or more of the client devices 802a-802n comprise one or more computing devices described below in relation to FIG. 9.

In addition, the environment 800 may also include the server(s) 806. The server(s) 806 may generate, store, receive, and transmit any type of data, including the music-to-pose NN 130, the pose-to-dance NN 150, and training videos, training images, and training audio files for training the synthesizer 100. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 9.

As shown in FIG. 8, the server(s) can include a management system 808. The management system 808 can include an implementation of software, hardware, or both for managing one or more digital images, videos, or audio files. For example, in one or more embodiments, the management system 808 comprises software (such as ADOBE STOCK software) that maintains, manages, and/or provides a repository of digital images for utilization by a plurality of client devices. Similarly, in one or more embodiments, the management system 808 comprises software that manages digital images or audio files captured by a client device and stored at the server(s) 806.

A server of the server(s) 806 may include a cloud-based service that is configured to execute on a host server, where the host server is configured to connect to a plurality of client devices 802a, 802b, . . . , 802n over a computer network 804. A client application program may be stored in one or more of the plurality of client devices 802a, 802b, . . . , 802n. In an exemplary embodiment, the client application program includes a user interface (e.g., a graphical user interface) configured to enable a user to select music and direct a camera of the corresponding client device to capture images of the user in a plurality of different poses. For example, the user interface could present the user with a selectable list listing music files stored in a certain directory or the user interface could enable the user to search the Internet for the music. The client application program is configured to output an audio waveform 120 of the music 105 and the images 160 (e.g., still images) across the computer network 804 to the cloud-based service (e.g., management system 808). The cloud-based service is configured to apply the audio waveform 120 to the music-to-pose neural network 130 to generate the first latent vector L1 describing the audio waveform and the sequence of coordinates of points P of body parts of the user, and apply the first latent vector L1, the sequence of coordinates, and the images 160 (e.g., still images of a person in several different poses) to the pose-to-dance neural network 150 to generate the video 170 of the person moving or dancing in synchronization with the music 105. The cloud-based service can then output the video 170 across the computer network 804 to the client device (e.g., 802a) from which it received the audio waveform 120 and the images 160. A user of the client device can then use a media player of the client device to play the video 170. The cloud-based service may also stream the video 170 across the computer network 804 to the client device so the user can use the media player to play video data received in the stream. The stream may be output across the network 804 directly to the media player.

In an alternate embodiment, the cloud-based service is configured to output or stream the video 170 to a client device (e.g., 802b) that differs from the one it received the audio waveform 120 and the images 160. In alternate embodiment, the music 105 or the audio waveform 120 originates on the server 806 or is retrieved by the server 806, and a user of the client device uses a client application of the client device to select the music 105 or audio waveform 120 from the server 806 or to direct the server 806 to download the same, for processing by music-to-pose neural network 130.

As illustrated, in one or more embodiments, the server(s) 806 (and/or the management system 808) can include all, or a portion of, the synthesizer 100. In particular, the synthesizer 100 can comprise an application running on the server(s) 806 (as part of the management system 808) or a portion of a software application that can be downloaded from the server(s) 806. For example, the synthesizer 100 can include a web hosting application that allows the client devices 802*a*-802*n* to interact with content hosted at the server(s) 806. To illustrate, in one or more embodiments of the exemplary environment 800, one or more client devices 802*a*-802*n* can access a webpage supported by the server(s) 806. In particular, the client device 802*a* can run an application to allow a user to access, view, and/or interact with a webpage or website hosted at the server(s) 806.

Although FIG. 8 illustrates a particular arrangement of the client devices 802*a*-802*n*, the network 804, and the server(s) 806, various additional arrangements are possible. For example, while FIG. 8 illustrates multiple separate client devices 802*a*-802*n* communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the synthesizer 100 can be implemented on a single computing device. In particular, the synthesizer 100 may be implemented in whole by the client device 802*a* or implemented in whole by the server(s) 806. Alternatively, the synthesizer 100 may be implemented across multiple devices or components (e.g., utilizing the client devices 802*a*-802*n* and the server(s) 806).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
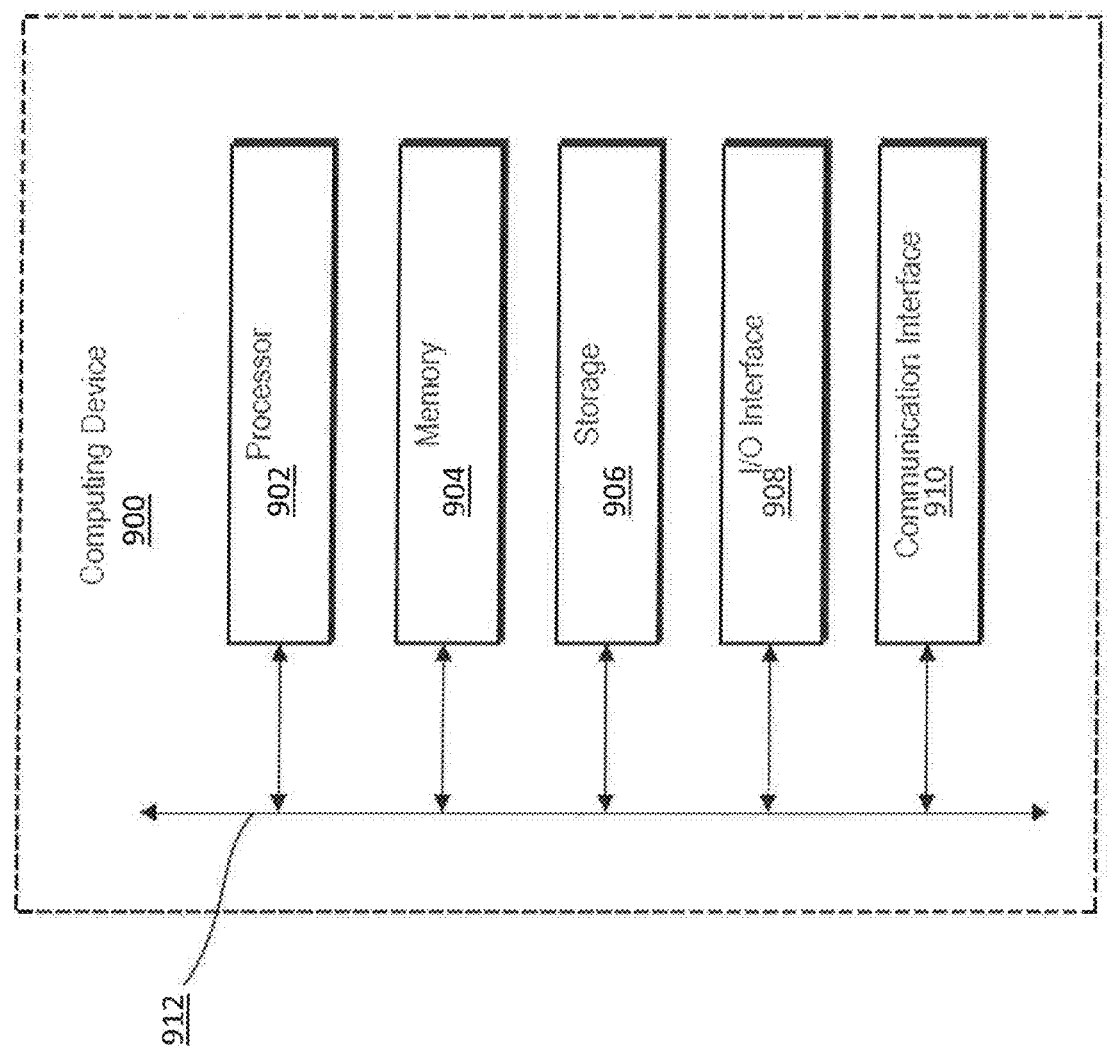
FIG. 9 illustrates an exemplary computing device that may be used to perform one or more methods of the disclosure.

FIG. 9 illustrates, in block diagram form, an exemplary computing device 900 that may be configured to perform one or more of the processes described above. One will appreciate that the music driven human dancing video synthesizer 100 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 912. The bus 912 can comprise hardware, software, or both that couples components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for generating a video of a body moving in synchronization with music, the method comprising:
    applying a first artificial neural network (ANN) to a sequence of samples of an audio waveform of the music to generate a first latent vector describing the audio waveform and a sequence of coordinates of points of body parts of the body;
    applying a first stage of a second ANN to the sequence of coordinates to generate a second latent vector describing movement of the body;
    applying a second stage of the second ANN to still images of a person in a plurality of different poses to generate a third latent vector describing an appearance of the person; and
    applying a third stage of the second ANN to the first latent vector, the second latent vector, and the third latent vector to generate the video of the body moving in synchronization with the music.

2. The method of claim 1, wherein the applying of the first ANN comprises:
    applying a first recurrent neural network (RNN) to the sequence of the samples to generate the first latent vector; and
    applying a second RNN to the first latent vector to generate the sequence of coordinates.

3. The method of claim 2, further comprising training the second RNN prior to the applying of the second RNN, wherein the training comprises:
    extracting ground-truth poses from a plurality of videos including a person dancing; and training the second RNN using the extracted ground-truth poses.

4. The method of claim 2, wherein the samples are input to a first layer of a long short-term memory (LSTM) of the first RNN and a first layer of a LSTM of the second RNN operates on an output of the first layer of the LSTM of the first RNN.

5. The method of claim 4, wherein a first one of the samples is applied to the first layer of the LSTM of the first RNN to generate a hidden state, and the hidden state and a second one of the samples is applied to the first layer of the LSTM of the first RNN.

6. The method of claim 1,
wherein the applying of the first stage comprises applying a first recurrent neural network (RNN) to the sequence of coordinates to generate the second latent vector,
wherein applying of the second stage comprises applying a first convolutional neural network (CNN) to the still images to generate the third latent vector.

7. The method of claim 6, wherein the applying of the third stage comprises:
concatenating all of the latent vectors;
applying a result of the concatenating to a second RNN; and
applying an output of the second RNN to a second CNN to generate the video.

8. The method of claim 1, wherein the video is generated to include a same background scene as a background scene in at least one of the still images.

9. The method of claim 1, further comprising periodically sampling the music to generate the sequence of samples before applying the first ANN.

10. The method of claim 9, wherein each sample includes a sequence of digits each representing an amplitude of the audio waveform.

11. The method of claim 9, wherein the periodic sampling comprises:
determining a series of amplitudes of the audio waveform over a plurality of time intervals;
normalizing the amplitudes to values between −1 and 1; and
generating the samples to respectively include a corresponding one of the values.

12. The method of claim 1, wherein the body parts include a head, a neck, left and right shoulders, left and right wrists, left and right hips, left and right knees, and left and right ankles.

13. The method of claim 12, wherein the sequence of coordinates include at least two coordinates of each of the body parts at different times.

14. The method of claim 1, where the first ANN is trained first and then the second ANN is appended to the first ANN to generate a combination, and the combination is trained together in an end-to-end manner.

15. A cloud-based system for generating a video of a user moving in synchronization with music, the system comprising:
a cloud-based service configured to execute on a host server, the host server configured to connect to a plurality of client devices over a computer network; and
a client application program stored in the plurality of client devices configured for execution by at least one of the plurality of client devices, the client application program configured to output an audio waveform of the music and still images of the user in a plurality of different poses across the computer network to the cloud-based service,
wherein the cloud-based service is configured to apply the audio waveform to a first neural network to generate a first latent vector describing the audio waveform and a sequence of coordinates of points of body parts, and apply the first latent vector, the sequence of coordinates, and the still images to a second neural network to generate the video of the user moving in synchronization with the music, and
wherein the second neural network is applied to the sequence of coordinates to generate a second latent vector describing movement of the user, applied to the still images to generate a third latent vector describing an appearance of the user, and applied to the first, second and third latent vectors to generate the video.

16. The cloud-based system of claim 15,
wherein the first neural network comprises a first artificial neural network (ANN) that is applied to samples of the audio waveform to generate the first latent vector, and
wherein the second neural network comprises a second ANN including first through third stages,
wherein the first stage is applied to the sequence of coordinates to generate the second latent vector describing movement of the user,
wherein the second stage is applied to the still images to generate the third latent vector describing an appearance of the user, and
wherein the third stage is applied to the first latent vector, the second latent vector, and the third latent vector to generate the video.

17. The cloud-based system of claim 16,
wherein the first ANN includes a first recurrent neural network (RNN) that is applied to the samples to generate the first latent vector and a second RNN that is applied to the first latent vector to generate the sequence of coordinates,
wherein the first stage includes a third RNN that is applied to the sequence of coordinates to generate the second latent vector, and
wherein the second stage includes a convolutional neural network (CNN) that is applied to the still images to generate the third latent vector.

18. The cloud-based system of claim 17, wherein the third stage includes a fourth RNN that is applied to a concatenation of all the latent vectors, and a second CNN that is applied to an output of the fourth RNN to generate the video.

19. A computer-implemented method for generating a video of a first person and a second person moving in synchronization with music and one another, the method comprising:
applying an audio waveform of music to a first neural network to generate a first latent vector describing the audio waveform and a sequence of coordinates of points of body parts;
applying the first latent vector, the sequence of coordinates, and still images of the first person in a plurality of different poses to a second neural network to generate first video frames of the first person;
applying the first latent vector, the sequence of coordinates, and still images of the second person in the poses to the second neural network to generate second video frames of the second person; and
overlaying each one of the first video frames with a corresponding one of the second video frames to generate the video of the first person and the second person moving in synchronization with the music and one another, wherein the second neural network is applied to the sequence of coordinates to generate a second latent vector describing movement of a body, applied to the still images of the first person to generate a third latent vector describing an appearance of the first person, and applied to the first, second, and third latent vectors to generate the first video frames.

20. The computer-implemented method of claim 19, wherein the first neural network comprises a first artificial neural network (ANN) that is applied to samples of the audio waveform to generate the first latent vector, wherein the second neural network comprises a second ANN that is applied to the sequence of coordinates to generate the second latent vector describing movement of a body, to the still images of the first person to generate the third latent vector describing an appearance of the first person, and to the first, second, and third latent vectors to generate the first video frames, and wherein the second ANN is applied to the still images of the second person to generate a fourth latent vector describing an appearance of the second person, and to the first, second, and fourth latent vectors to generate the second video frames.

* * * * *